(12) United States Patent
Fitzgerald et al.

(10) Patent No.: US 8,600,943 B1
(45) Date of Patent: Dec. 3, 2013

(54) PORTING REPLICATION RELATIONSHIPS

(75) Inventors: John T. Fitzgerald, Mansfield, MA (US); David Meiri, Cambridge, MA (US); Dan Arnon, Somerville, MA (US); Patrick Brian Riordan, West Newton, MA (US); Alex Veprinsky, Brookline, MA (US); John Sopka, Groton, MA (US)

(73) Assignee: EMC Corporation, Hopkinton, MA (US)

( * ) Notice: Subject to any disclaimer, the term of this patent is extended or adjusted under 35 U.S.C. 154(b) by 39 days.

(21) Appl. No.: 13/317,792

(22) Filed: Oct. 28, 2011

Related U.S. Application Data

(63) Continuation-in-part of application No. 12/930,251, filed on Dec. 31, 2010.

(51) Int. Cl.
   *G06F 17/30* (2006.01)
(52) U.S. Cl.
   USPC ........... 707/641; 707/640; 707/661; 707/644; 707/645; 707/646; 707/647; 707/648; 707/649; 707/650; 707/651; 707/652; 707/653; 707/654; 707/803
(58) Field of Classification Search
   USPC .................. 707/661, 640–641, 644–654, 803
   See application file for complete search history.

(56) References Cited

U.S. PATENT DOCUMENTS

| | | | |
|---|---|---|---|
| 6,889,232 B2 * | 5/2005 | Pudipeddi et al. | 1/1 |
| 7,054,883 B2 | 5/2006 | Meiri et al. | |
| 7,284,015 B2 * | 10/2007 | Pudipeddi et al. | 1/1 |
| 7,340,489 B2 | 3/2008 | Vishlitzky et al. | |
| 8,065,276 B2 * | 11/2011 | Pudipeddi et al. | 707/661 |
| 8,341,459 B2 * | 12/2012 | Kaushik et al. | 714/6.3 |
| 8,375,063 B2 * | 2/2013 | Putman | 707/803 |
| 8,468,180 B1 | 6/2013 | Meiri et al. | |
| 2013/0080827 A1 * | 3/2013 | Kaushik et al. | 714/6.3 |
| 2013/0138702 A1 * | 5/2013 | Putman | 707/803 |
| 2013/0179655 A1 * | 7/2013 | Mashitizadeh et al. | 711/162 |

* cited by examiner

*Primary Examiner* — Frantz Coby
(74) *Attorney, Agent, or Firm* — Muirhead and Saturnelli, LLC

(57) ABSTRACT

Migrating data from an old storage device to a new storage device includes transferring the data from a first logical device on the old storage device to a second logical device on the new storage device, determining replication relationships for the first logical device, transferring the replication relationships; and transferring logical devices used for the replication relationships from the old storage device to the new storage device. The replication relationships may include a clone of the first logical device. Migrating data from an old storage device to a new storage device may also include suspending writes to the first logical storage device prior to transferring the data for the first logical storage device. The replication relationships may include at least one snapshot.

20 Claims, 16 Drawing Sheets

| VOLUME INFORMATION | | | |
|---|---|---|---|
| SOURCE 1 | TARGET 1 | LUN 1 | STATE 1 |
| SOURCE 2 | TARGET 2 | LUN 2 | STATE 2 |
| ⋯ | ⋯ | ⋯ | ⋯ |
| SOURCE N | TARGET N | LUN N | STATE N |

130

131 – VOLUME INFORMATION
132 – SOURCE / TARGET
133 – LUN
134 – SOURCE N row

FIG. 5

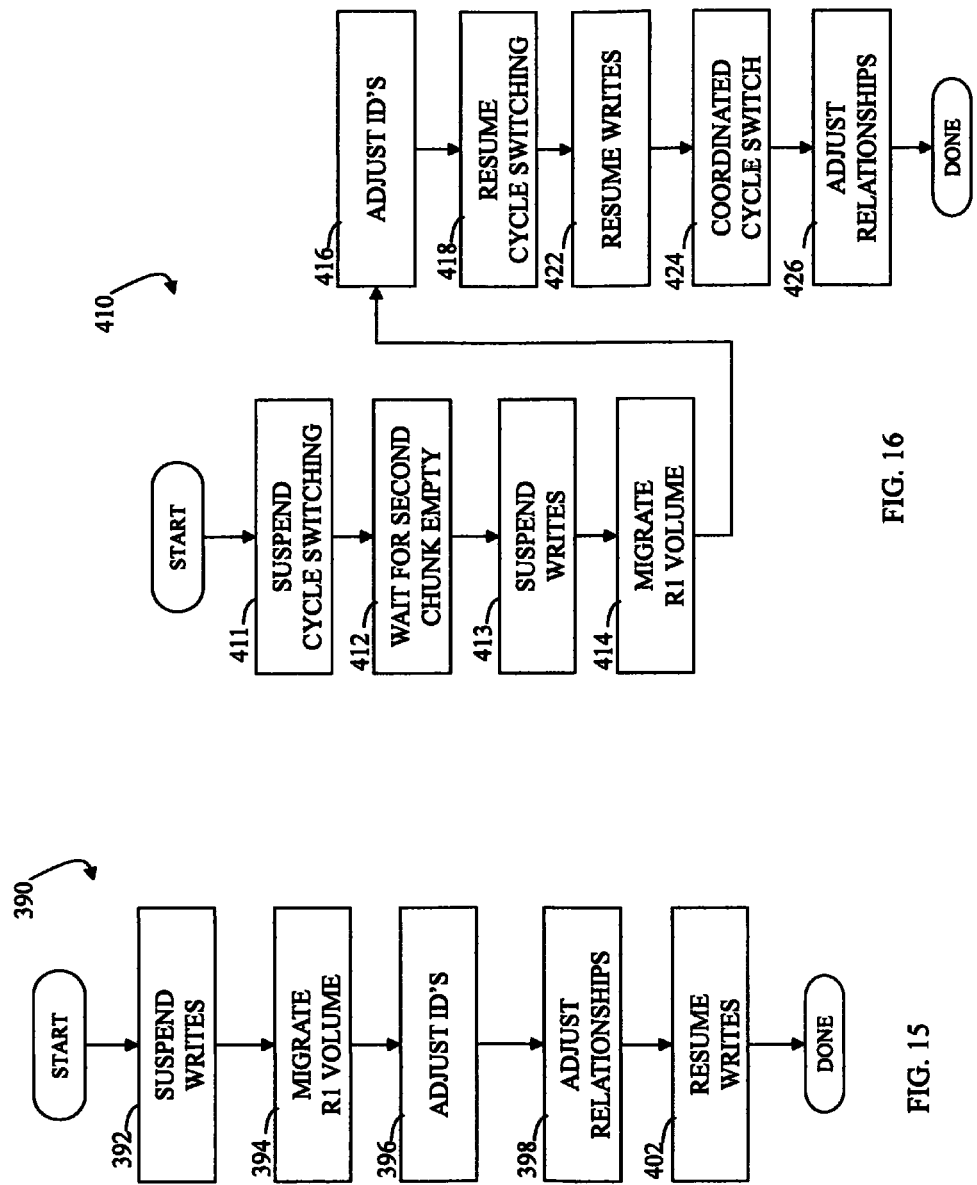

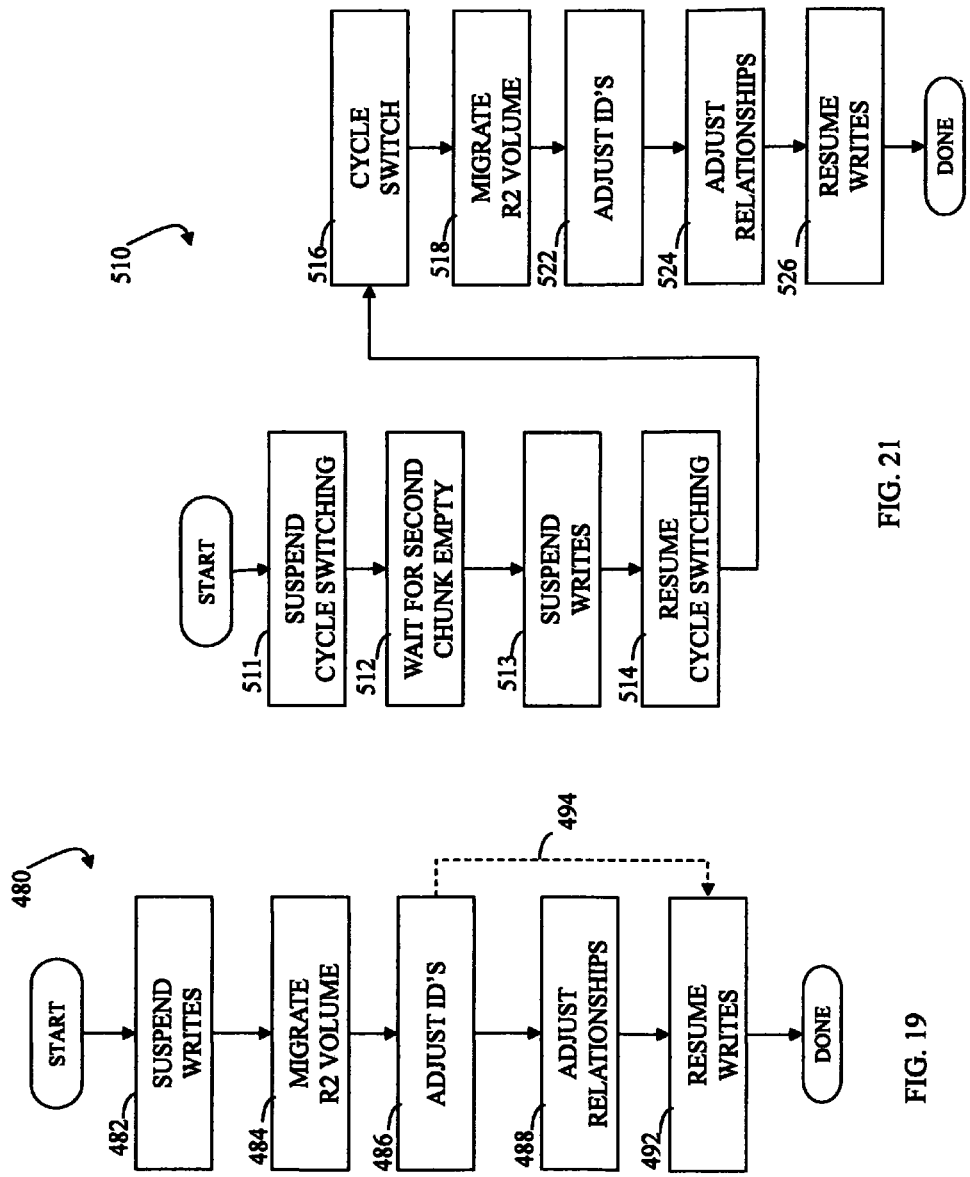

PORTING REPLICATION RELATIONSHIPS

CROSS-REFERENCE TO RELATED APPLICATIONS

This application is a continuation-in-part of U.S. patent application Ser. No. 12/930,251 filed on Dec. 31, 2010 (pending), which is incorporated by reference herein.

BACKGROUND OF THE INVENTION

1. Technical Field

This application relates to the field of storage devices, and more particularly to the field of migrating data between storage devices.

2. Description of Related Art

It is desirable to be able to move user applications and data among servers and storage arrays in a non-disruptive fashion while the user is actively using the applications and/or data. Although various techniques exist to facilitate non-disruptive data migration, these techniques do not necessarily properly transfer I/O state information. However, many systems rely on metadata, such as I/O state information, for proper operation. For example, in some computer cluster configurations, each of the computers maintains its state (active or passive) and, in some cases, changes its state, based on I/O metadata. Such a system may not operate properly if data was migrated without also properly migrating the metadata.

In addition, in some cases, data being migrated may originate on volumes having corresponding replication relationships, such as local clones, snapshots, synchronous or asynchronous remote copies, etc. However, the replication relationships are not necessarily maintained automatically when the data is migrated. In such cases, a user must manually ensure that the data is migrated to volumes possessing similar replication relationships and/or manually set up the replication relationships at a new site.

Accordingly, it is desirable to provide a system that can facilitate migrating data as well automatically migrating associated replication relationships and corresponding data.

SUMMARY OF THE INVENTION

According to the system described herein, migrating data from an old storage device to a new storage device includes transferring the data from a first logical device on the old storage device to a second logical device on the new storage device, determining replication relationships for the first logical device, transferring the replication relationships; and transferring logical devices used for the replication relationships from the old storage device to the new storage device. The replication relationships may include a clone of the first logical device. Migrating data from an old storage device to a new storage device may also include suspending writes to the first logical storage device prior to transferring the data for the first logical storage device. The replication relationships may include at least one snapshot. Migrating data from an old storage device to a new storage device may also include suspending writes to the first logical device and transferring snapshot data from the old storage device to the new storage device after suspending writes to the first logical device. The replication relationships may include at least one synchronous data transfer from the first logical device to a third logical device on another storage device. Migrating data from an old storage device to a new storage device may also include suspending writes to the first logical device prior to transferring the data from the first logical device to the second logical device and resuming writes to the second logical device after transferring the data from the first logical device to the second logical device. The replication relationships may include at least one asynchronous data transfer from the first logical device to a third logical device on another storage device and where data writes begun after a first time and before a second time may be associated with a first chunk of data and data writes begun after the second time may be associated with a second chunk of data different from the first chunk of data, the times corresponding to transfer cycles. Migrating data from an old storage device to a new storage device may also include suspending writes to the first logical device and suspending switching transfer cycles prior to transferring the data from the first logical device to the second logical device and resuming writes to the second logical device and resuming switching transfer cycles after transferring the data from the first logical device to the second logical device. Migrating data from an old storage device to a new storage device may also include waiting for the first chunk of data to be transferred to the third logical device prior to suspending switching transfer cycles. The replication relationships may include at least one asynchronous data transfer from a third logical device on another storage device to the first logical device and data writes begun after a first time and before a second time may be associated with a first chunk of data and data writes begun after the second time may be associated with a second chunk of data different from the first chunk of data, the times corresponding to transfer cycles. Migrating data from an old storage device to a new storage device may also include suspending writes to the third logical device and suspending switching transfer cycles prior to transferring the data from the first logical device to the second logical device and resuming writes to the third logical device and resuming switching transfer cycles after transferring the data from the first logical device to the second logical device. Migrating data from an old storage device to a new storage device may also include waiting for the first chunk of data to be transferred to the first logical device prior to suspending switching transfer cycles.

According further to the system described herein, computer software, provided in a non-transitory computer-readable medium, facilitates migration of data from an old storage device to a new storage device. The software includes executable code that transfers the data from a first logical device on the old storage device to a second logical device on the new storage device, executable code that determines replication relationships for the first logical device, executable code that transfers the replication relationships, and executable code that transfers logical devices used for the replication relationships from the old storage device to the new storage device. The software may also include executable code that suspends writes to the first logical storage device prior to transferring the data for the first logical storage device, where the replication relationships include a clone of the first logical device. The software may also include executable code that suspends writes to the first logical device and executable code that transfers snapshot data from the old storage device to the new storage device after suspending writes to the first logical device, where the replication relationships include at least one snapshot. The software may also include executable code that suspends writes to the first logical device prior to transferring the data from the first logical device to the second logical device and executable code that resumes writes to the second logical device after transferring the data from the first logical device to the second logical device, where the replication relationships include at least one synchronous data transfer from the first logical device to a third logical device on another storage device. The software may also include executable code that suspends writes to the first logical device and suspends switching transfer cycles prior to transferring the data from the first logical device to the second logical device and executable code that resumes writes to the second logical device and resumes switching transfer cycles after transferring the data from the first logical device to the second logical device, where the replication relationships include at least one asynchronous data transfer from the first logical device to a third logical device on another storage device and where data writes begun after a first time and before a second time are associated with a first chunk of data and data writes begun after the second time are associated with a second chunk of data different from the first chunk of data, the times corresponding to transfer cycles. The software may also include executable code that waits for the first chunk of data to be transferred to the third logical device prior to suspending switching transfer cycles. The software may also include executable code that suspends writes to the third logical device and suspends switching transfer cycles prior to transferring the data from the first logical device to the second logical device, executable code that resumes writes to the third logical device and resumes switching transfer cycles after transferring the data from the first logical device to the second logical device, and executable code that waits for the first chunk of data to be transferred to the first logical device prior to suspending switching transfer cycles, where the replication relationships include at least one asynchronous data transfer from a third logical device on another storage device to the first logical device and where data writes begun after a first time and before a second time are associated with a first chunk of data and data writes begun after the second time are associated with a second chunk of data different from the first chunk of data, the times corresponding to transfer cycles.

BRIEF DESCRIPTION OF DRAWINGS

FIG. 5 is a diagram illustrating a volume entry for a metadata table according to an embodiment of the system described herein.

FIG. 15 is a flow chart illustrating steps performed in connection with migrating an R1 volume used in a remote replication relationship according to an embodiment of the system described herein.

FIG. 16 is a flow chart illustrating steps performed in connection with migrating an R1 volume used in a remote replication relationship according to another embodiment of the system described herein.

FIG. 19 is a flow chart illustrating steps performed in connection with migrating an R2 volume used in a remote replication relationship according to an embodiment of the system described herein.

FIG. 21 is a flow chart illustrating steps performed in connection with migrating an R2 volume used in a remote replication relationship according to another embodiment of the system described herein.

DETAILED DESCRIPTION OF VARIOUS EMBODIMENTS

Figure 1:
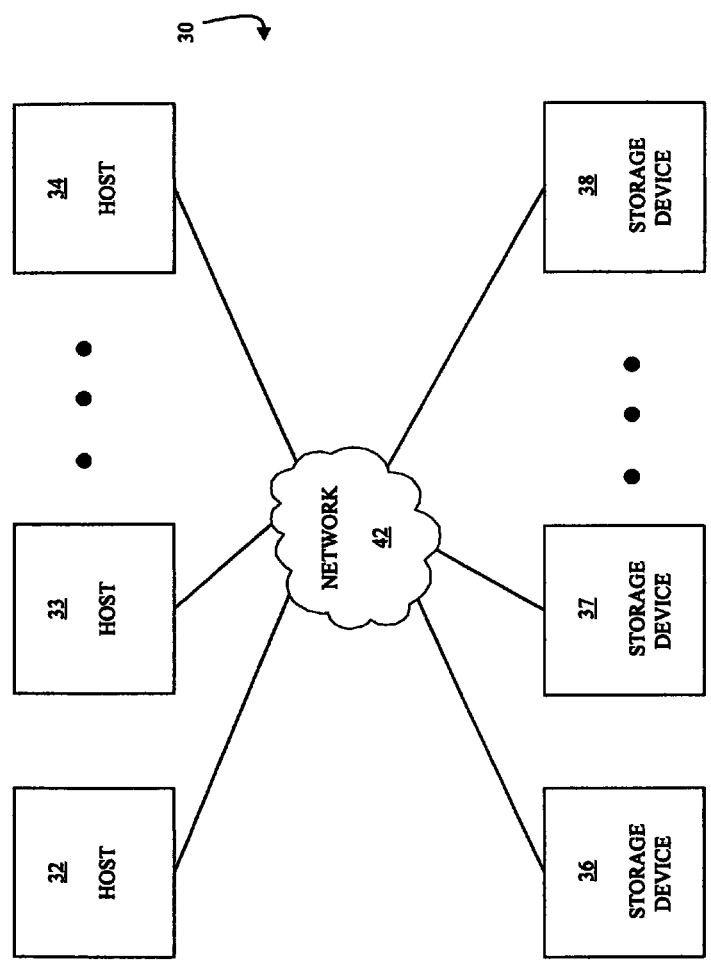
FIG. 1 is a schematic a diagram that shows a plurality of hosts coupled to a plurality of storage devices via a network according to an embodiment of the system described herein.

Referring to FIG. 1, a diagram 30 shows a plurality of hosts 32-34 coupled to a plurality of storage devices 36-38 via a network 42. The hosts 32-34 represent any processing devices. There may be any number of hosts and the hosts 32-34 may or may not be the same (i.e., the same type of device). Similarly, the storage devices 36-38 represent any storage devices. There may be any number of storage devices and the storage devices 36-38 may or may not be the same (i.e., same type of device). Each of the hosts 32-34 may be selectively coupled to one or more of the storage devices 36-38 to access data therefrom through the network 42. Note that each of the storage devices 36-38 may be coupled to more than one of the hosts 32-34. The network may be any appropriate mechanism for providing data interconnections, including a SAN, a WAN, a LAN, the World-Wide Web, a cloud; etc. or some combination thereof.

The system described herein provides for porting executable images (e.g., programs) from one of the hosts 32-34 to another one of the hosts 32-34, porting data images (e.g., data) from one of the storage devices 36-38 to another one of the storage devices 36-38, and/or both. As discussed in detail herein, it is desirable to be able to maintain metadata (state information) in connection with porting executable images and/or data. The system described herein provides a mechanism for doing so. The hosts 32-34 are connected to the storage devices 36-38 via paths therebetween. Paths are described in more detail below.

Figure 2:
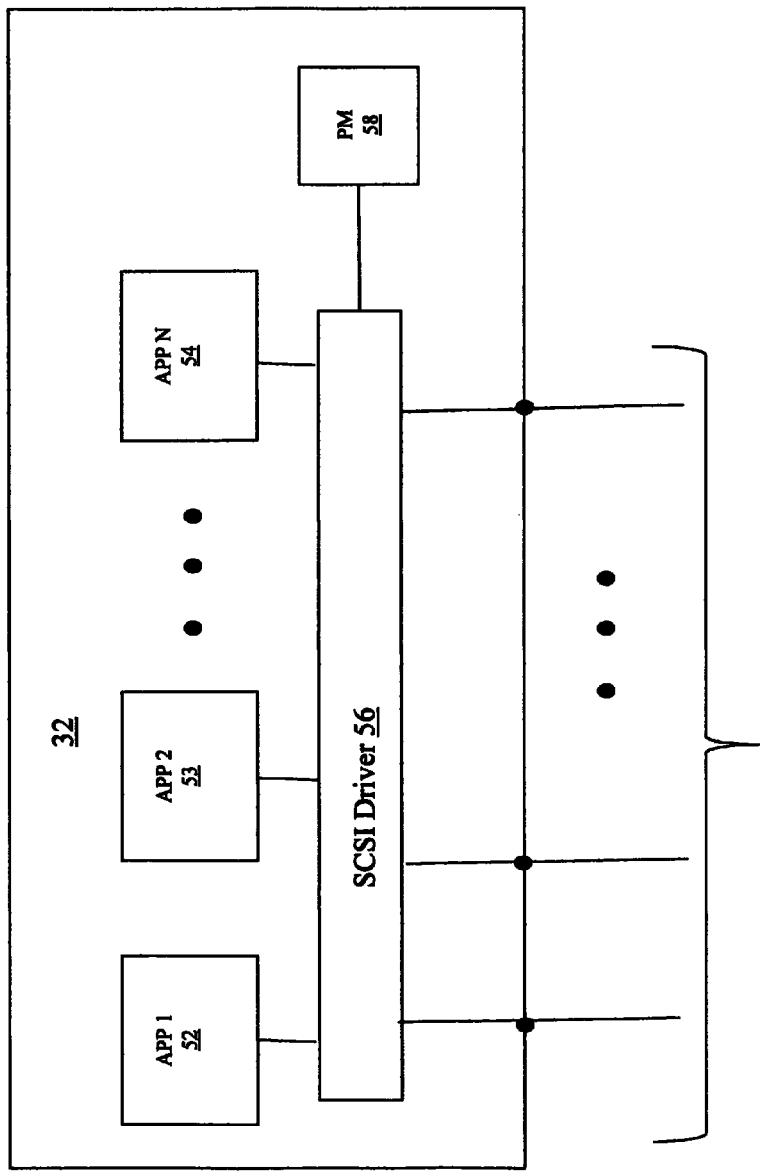
FIG. 2 is a schematic diagram illustrating in more detail a host according to an embodiment of the system described herein.

Referring to FIG. 2, the host 32 is shown in more detail as including a plurality of applications 52-54, a SCSI driver 56, and a process manager 58. Although the specific host 32 is shown in FIG. 2, the discussion herein is meant to include any host or other processing device. The applications 52-54 represent any number of applications that may perform any appropriate type of processing. The applications 52-54 send and receive I/O through the SCSI driver 56, which provides appropriate low level driver functionality to the applications 52-54. In an embodiment herein, the SCSI driver 56 may provide conventional SCSI I/O functionality. Note that the applications 52-54 may be clustered with each other and/or with other applications on different devices (e.g., other hosts). Thus, applications running on different hosts can be parts of the same clustered application. Clustering applications on different hosts is known in the art.

The host 32 also includes a plurality of ports 62 that provide logical I/O channels for the host 32. Each of the ports 62 may correspond to a separate physical connection or at least some of the ports 62 may correspond to the same physical connection. The SCSI driver 56 may maintain a connection table indicating which of the ports 62 is coupled to which of the applications 52-54 and also possibly indicating the state of each of the ports 62. Each of the applications 52-54 may also internally maintain a similar connection table. In some embodiments, it is possible for each of the applications 52-54 and/or the SCSI driver 56 to use different internal identifiers to refer to the same one of the ports 62.

The process manager 58 interacts with the SCSI driver 56 to facilitate migration of port metadata (state information) along with migration of corresponding data. That is, for example, if the host 32 initially performs I/O operations using a volume on the storage device 36, but then switches to using a different volume on the storage device 37, the process manager 58 facilitates the switch by handling the appropriate transfer of the metadata corresponding to the data. Operation of the process manager 58 is described in more detail elsewhere herein. The process manager 58 may also facilitate hibernation, as described in more detail elsewhere herein. In other embodiments, the process manager 58 may be provided on a separate device from the host 32 and/or may be distributed among a plurality of different devices that may include the host 32.

Figure 3:
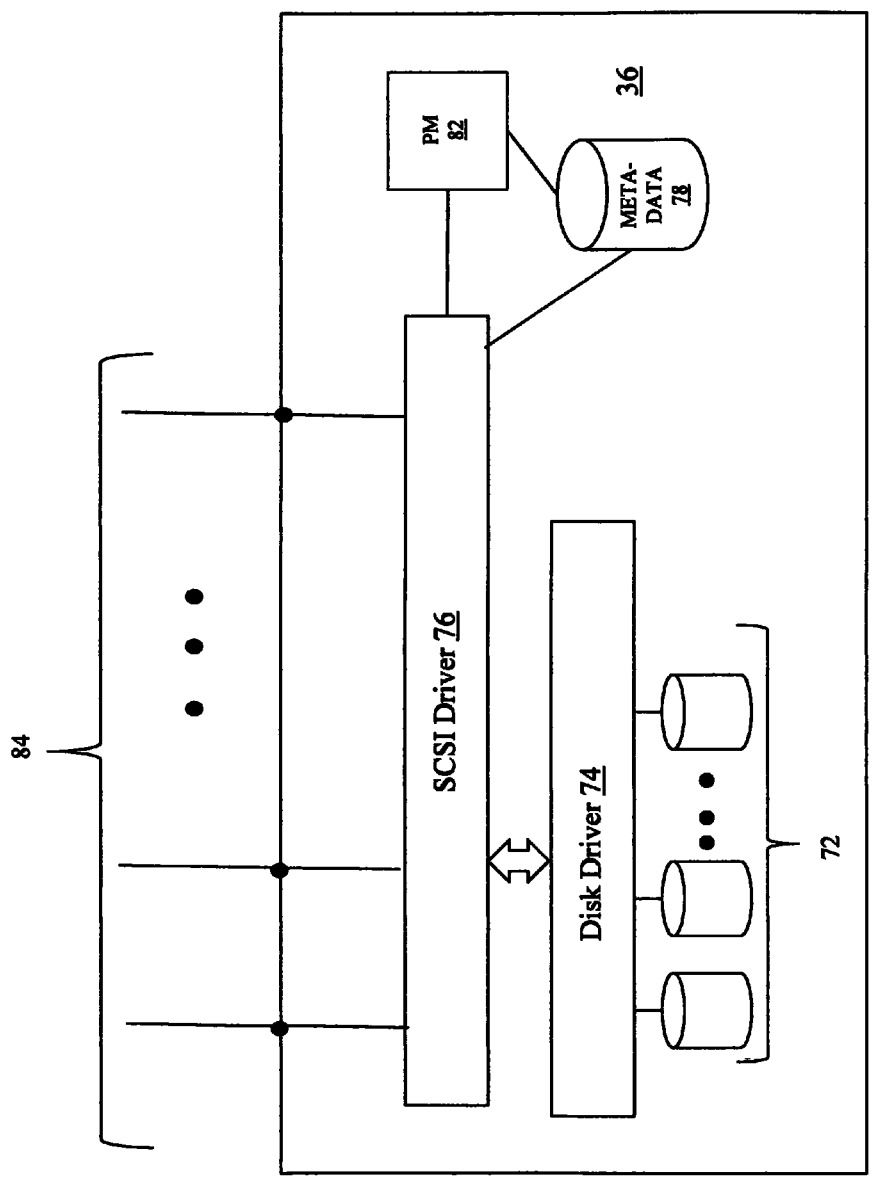
FIG. 3 is a schematic diagram illustrating in more detail a host according to an embodiment of the system described herein.

Referring to FIG. 3, the storage device 36 is shown in more detail as including one or more storage units 72, a disk driver 74 coupled to the storage units 72, and a SCSI driver 76 coupled to the disk driver 74. Although the specific storage device 36 is shown in FIG. 3, the discussion herein is meant to include any appropriate storage device. The storage device 36 may be a disk array storage device so that the storage units 72 are disk drives. Of course, the storage device 36 could be any other type of storage device. The SCSI driver 76 is like the SCSI driver 56, discussed above in connection with FIG. 2, except that the SCSI driver 76 provides I/O for the storage device 36 rather than the host 32. In an embodiment herein, the SCSI driver 76 acts as a target to receive I/Os while the SCSI driver 56 acts as an initiator to send I/Os.

The storage device 36 also includes SCSI metadata 78 (state information), coupled to the SCSI driver 76, that maintains, inter alia, the state of connections to the storage device 36. A process manager 82 is coupled to both the SCSI driver 76 and the SCSI metadata 78. The storage device 36 also includes a plurality of ports 84 that provide logical I/O channels for the storage device 36. As with the host 32, each of the ports 84 may correspond to a separate physical connection or at least some of the ports 84 may correspond to the same physical connection. The SCSI driver 76 may maintain a connection table indicating which of the ports 84 is coupled to which of the storage units 72 and also possibly indicating the state of each of the ports 84.

The process manager 82 interacts with the SCSI driver 76 to facilitate migration of port metadata (state information) along with migration of corresponding data. That is, for example, if the host 32 initially performs I/O operations using the storage device 36, but then switches to using the storage device 37, the process manager 84 facilitates the switch by handling the appropriate transfer of metadata. The process manager 82 may also facilitate hibernation, as described in more detail elsewhere herein. Operation of the process manager 84 is described in more detail elsewhere herein. In other embodiments, the process manager 82 may be provided on a separate device from the storage device 36 and/or may be distributed among a plurality of different devices that may include the storage device 36.

Connections between the hosts 32-34 and the storage devices 36-38 may be provided by defining a plurality of paths therebetween through the network 42. Each of the paths may include a source port (initiator port), a destination port (target port), and a port state identifier (state descriptor). The source port may correspond to a port on one of the hosts 32-34 while the destination port may correspond to a port on one of the storage devices 36-38. The defined paths may correspond to the connection tables maintained by the hosts 32-34 and the storage devices 36-38. See, for example, "SCSI Architectural Model v. 4" (or SAM-4 for short) at the Web site www.t10.org.

In an embodiment herein, the process manager 58 of the host 32 is used to facilitate migration from one of the hosts 32-34 to another one of the hosts 32-34 while the process manager 82 of the storage device 36 is used to facilitate migration from one of the storage devices 36-38 to another one of the storage devices 36-38. Of course, it is also possible to have other arrangements so that, for example, the process manager 58 of the host 32 may be used to facilitate migration from one of the storage devices 36-38 to another one of the storage devices 36-38 and/or the process manager 82 of the storage device 36 is used to facilitate migration from one of the hosts 32-34 to another one of the hosts 32-34.

Figure 4:
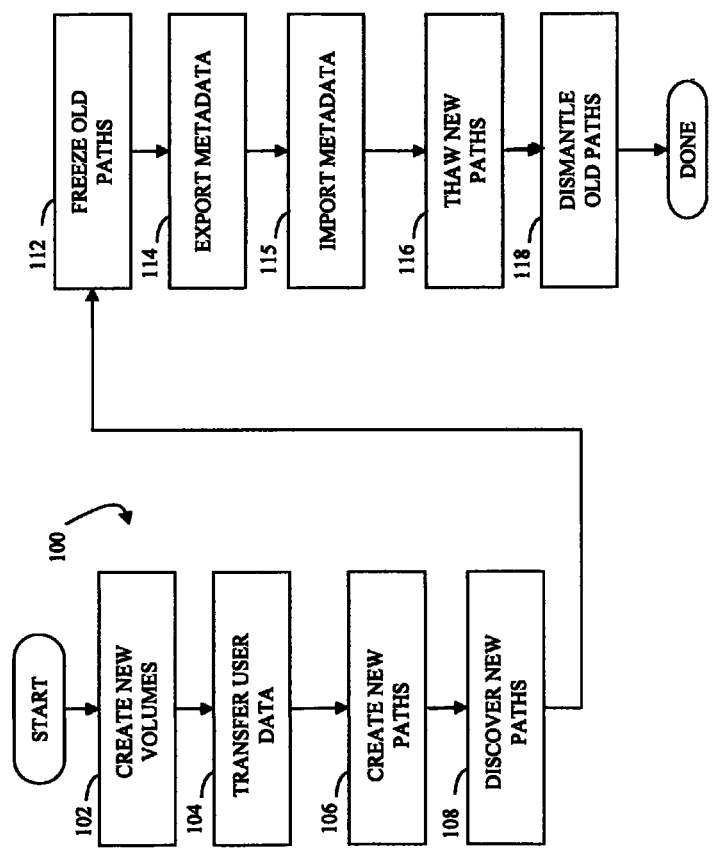
FIG. 4 is a flow chart illustrating steps performed by a process manager for migration according to an embodiment of the system described herein.

Referring to FIG. 4, a flow chart 100 illustrates steps performed in connection with migrating from using a first one of the storage devices 36-38 (old storage device) to using a second one of the storage devices 36-38 (new storage device). As used herein, "old" and "new" may be used to refer to source and target storage devices, respectively, and may not necessarily indicate a relative age of the storage devices. It is desirable to be able to provide the migration in a way that is transparent to an entity accessing the data and does not require suspension of the entities accessing the data. That is, one or more of the applications 52-54 on one or more of the hosts 32-34 operate continuously before and after migration of data from one of the storage devices 36-38 to another one of the storage devices 36-38. As described elsewhere herein, providing a seamless migration includes properly migrating metadata (state information) associated with the data. Note that the processing illustrated by the flow chart 100 may be performed by the process manager 82 of the storage device 36 and/or by other appropriate processes/devices, such as the process manager 58 possibly in concert with other processing devices.

Processing for the flow chart 100 begins at a step 102 where new volumes (e.g., logical volumes) are created on the new storage device. The new volumes will contain the data that is being transferred to the new storage device. Following the step 102 is a step 104 where the user data is transferred from the volumes on the old storage device to the volumes on the new storage device using any appropriate technique. Mechanisms for transferring user data are known. In some embodiments, user data migration is initiated at the step 104 and is performed asynchronously and in parallel with respect to the remaining processing performed in connection with the flow chart 100.

Following the step 104 is a step 106 where new paths are created from the one or more of the hosts (computing devices) to the new storage device. Following the step 106 is a step 108 where the new paths are discovered (e.g., the source entities determine the target ports and characteristics of devices corresponding thereto). In an embodiment herein, the paths to the new storage device are initiated in a frozen state, which prevents any new I/O operations being performed using those paths.

Following the step 108 is a step 112 where the paths from the old storage device are frozen. Making the paths frozen at the step 112 prevents any new I/O operations being performed using those paths. In some embodiments, new I/Os may be queued without being processed. Note, however, that any I/O operations initiated prior to freezing the paths are either completed or, in some embodiments, aborted. Following the step 112 is a step 114 where metadata (including state information) for the device is exported. In an embodiment herein, the metadata may be exported into a platform-independent format. In some cases, other transformations may be performed. Note that the metadata may be provided on a per volume basis.

Following the step 114 is a step 115 where the metadata is imported to the new storage device. As discussed elsewhere herein, the metadata may be exported in a platform-independent format which can be subsequently imported by (or on behalf of) a storage device. The platform-independent format may be converted to a format for a specific platform for the new storage device in connection with importing the metadata.

Following the step 115 is a step 116 where the paths to the new storage device (discussed above) are thawed to allow I/O operations therewith. Following the step 116 is a step 118 where the paths to the old storage device are dismantled. Dismantling the old paths at the step 118 is performed by an appropriate mechanism depending upon how the paths are implemented. Following the step 118, processing is complete.

Note that, in some cases, the result of freezing the old paths at the step 112 may leave unprocessed I/Os in the paths prior to dismantling the paths at the step 118. Of course, as discussed elsewhere herein, although freezing a path prohibits new I/Os from being provided, the path is still capable of processing I/Os that were already in process before the freeze operation (i.e., draining the path). However, it is possible for some I/Os not to drain prior to dismantling the path at the step 118. In some cases, a host will be notified that the outstanding I/O to those paths has not completed or will realize it in some other way (e.g., timed out), in which case the host will re-issues the same I/Os through another path (i.e., one of the new paths).

Referring to FIG. 5, a volume entry 130 for a metadata table includes volume information 131 and a plurality of path entries 132-134 where each describes a specific path to or from the volume. In an embodiment herein, a metadata table for an application includes an entry for each of the volumes used by the application where each of the entries is like the volume entry 130 shown in FIG. 5. The volume information 131 includes volume specific metadata, such as the volume geometry, the world-wide name of the volume, etc. Of course, the particular volume metadata used for the volume information 131 is somewhat implementation dependent.

Each of the path entries 132-134 includes, an initiator port, a target port, a logical unit number (LUN), and a state descriptor. The initiator port may be the port that sends I/Os through the path while the target port receives I/Os through the path. The port identifiers may be global identifiers that distinguish particular ports from other ports. The LUNs, on the other hand, may be local to whatever entity is maintaining a copy of the table 130. The state descriptor may indicate information about the path in the context of the volume metadata. In an embodiment herein, the path state information may include reservation information, for example corresponding to SCSI-2 or SCSI-3 reservations. In addition, the path state information may include key registrations and other information created by a host. In some cases, the path state information may indicate whether a path is blocked, frozen or unfrozen.

In an embodiment herein, the metadata table 130 may be transferred by first creating a data structure to contain the information in the table 130, populating the structure with data from the table 130, and then using the structure to create a new version of the table 130 at the new storage device. Note that the system described herein may be used in instances where data is being migrated to dissimilar types of storage devices, and the metadata table 130 may have a different structure at the new storage device than at the old storage device. The data structure used to store the metadata table may be platform independent. In some embodiments, other types of transformations may be provided. For example, the transformation may include adding a Unit Attention message to all the new paths, to notify the host that all the IOs that were queued in the old paths are lost and have to be retried.

Figure 6:
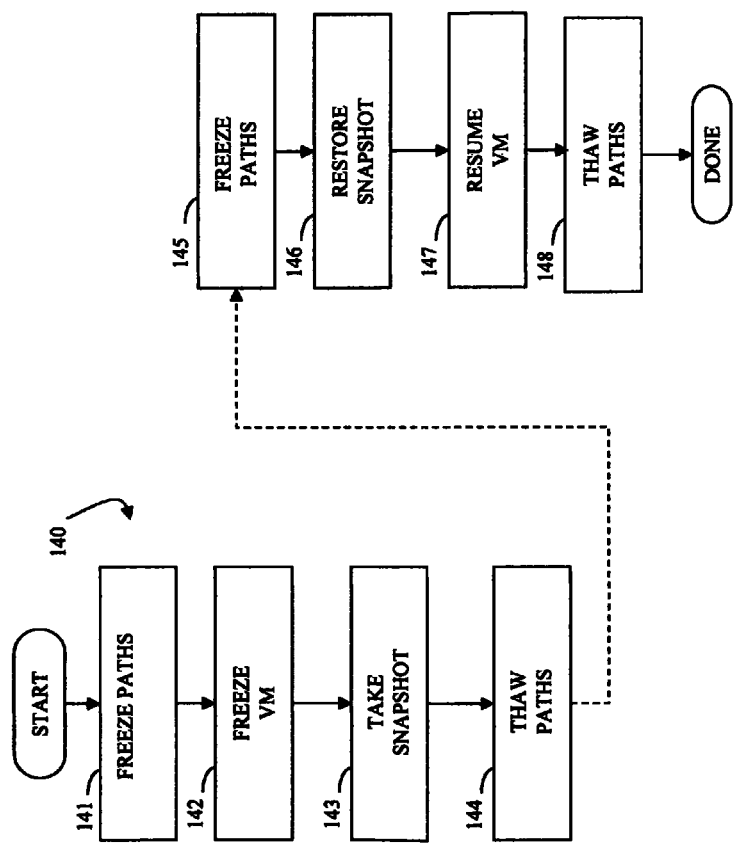
FIG. 6 is a flow chart illustrating steps performed by a process manager for hibernation according to an embodiment of the system described herein.

Referring to FIG. 6, a flow chart 140 illustrates steps performed in connection with hibernating and then subsequently thawing a process using the system described herein. As with migration, it is desirable to be able to provide hibernation in a way that is transparent to an entity accessing the data (e.g., one or more VM's) and does not require suspension of the entities accessing the data. That is, one or more of the applications 52-54 on one or more of the hosts 32-34 appear to themselves to operate continuously before and after hibernation. Note that the processing illustrated by the flow chart 140 may be performed by the process manager 82 of the storage device 36 and/or by other appropriate processes/devices, such as the process manager 58 possibly in concert with other processing devices.

Processing for the flow chart 140 begins at a step 141 where the paths to the storage device of the process are frozen. Making the paths frozen at the step 141 prevents any new I/O operations being performed using those paths. Note, however, that any I/O operations initiated prior to freezing the paths are completed. Following the step 141 is a step 142 where the VM corresponding to the process being hibernated is frozen (suspended). Following the step 142 is a step 143 where a snapshot is obtained of the current data, including the state of the data and any metadata corresponding to data volumes used by the virtual machine. In some embodiments, the metadata may be stored in a platform-independent format. Following the step 143 is a step 144 where the paths are thawed to allow I/O operations therewith.

After some time, it may be desirable to wake up from hibernation. Accordingly, following the step 144 is a step 145 where the paths for the VM are frozen. Note that, in some embodiments, the steps 144, 145 may be optional. For example, if no other processes are using the data, then the step 144, 145 may be omitted so that the paths remain frozen until the process is revived from hibernation. Following the step 145 is a step 146 where the snapshot (obtained at the step 143) is restored, including any metadata corresponding to the snapshot. Following the step 146 is a step 147 where the VM is resumed. Following the step 147 is a step 148 where the paths are thawed. Following the step 148, processing is complete.

Figure 7:
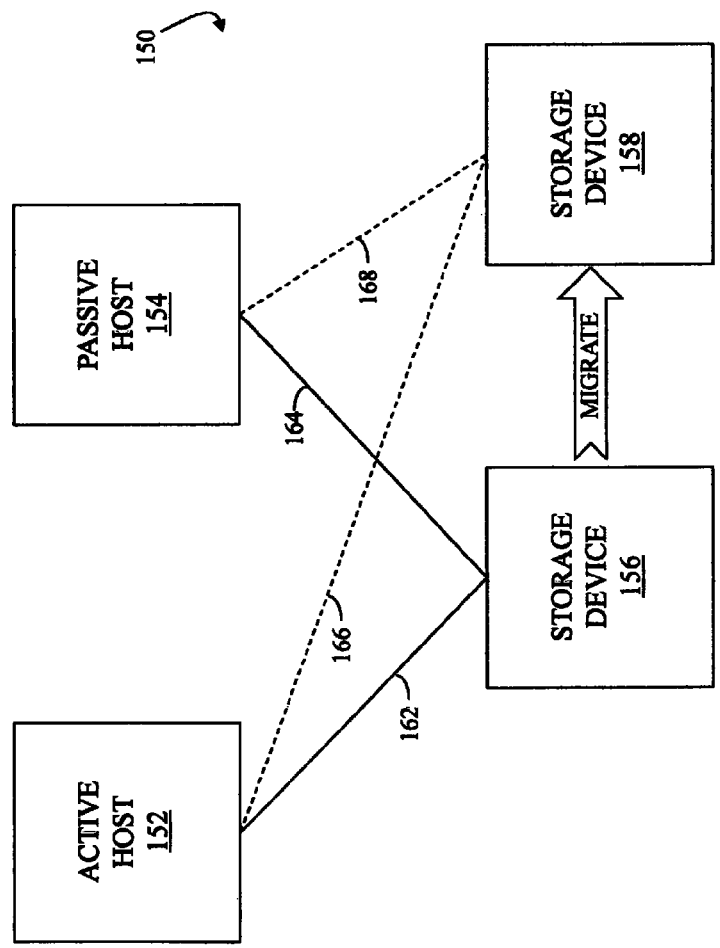
FIG. 7 is a schematic a diagram that shows an active host and a passive host coupled to an old storage device and a new storage device according to an embodiment of the system described herein.

Referring to FIG. 7, a diagram 150 illustrates an active host 152 and a passive host 154 accessing a storage device 156. In the example of FIG. 7, the active host 152 and the passive host 154 access the same data on the storage device 156. The active host 152 performs work in the form of one or more applications that read and write data to the storage device 156. The passive host 154 is maintained as a fallback in case the active host 152 fails. As described in more detail elsewhere herein, the system uses storage state information to determine when to make the passive host 154 active.

The diagram 150 also illustrates migrating data from the storage device 156 to another storage device 158. Migrating the data includes migrating corresponding state information so that, after the migration, the active host 152 and the passive host 154 preserve the relationship that existed prior to the migration. A first path 162 is provided from the active host 152 to the storage device 156 while a second path 164 is provided from the passive host 154 to the storage device 156. As a result of the migration, the path 162 is replaced by a new path 166 from the active host 152 to the new storage device 158 while the path 164 is replaced by a new path 168 from the passive host 154 to the new storage device 158.

Figures 8, 9:
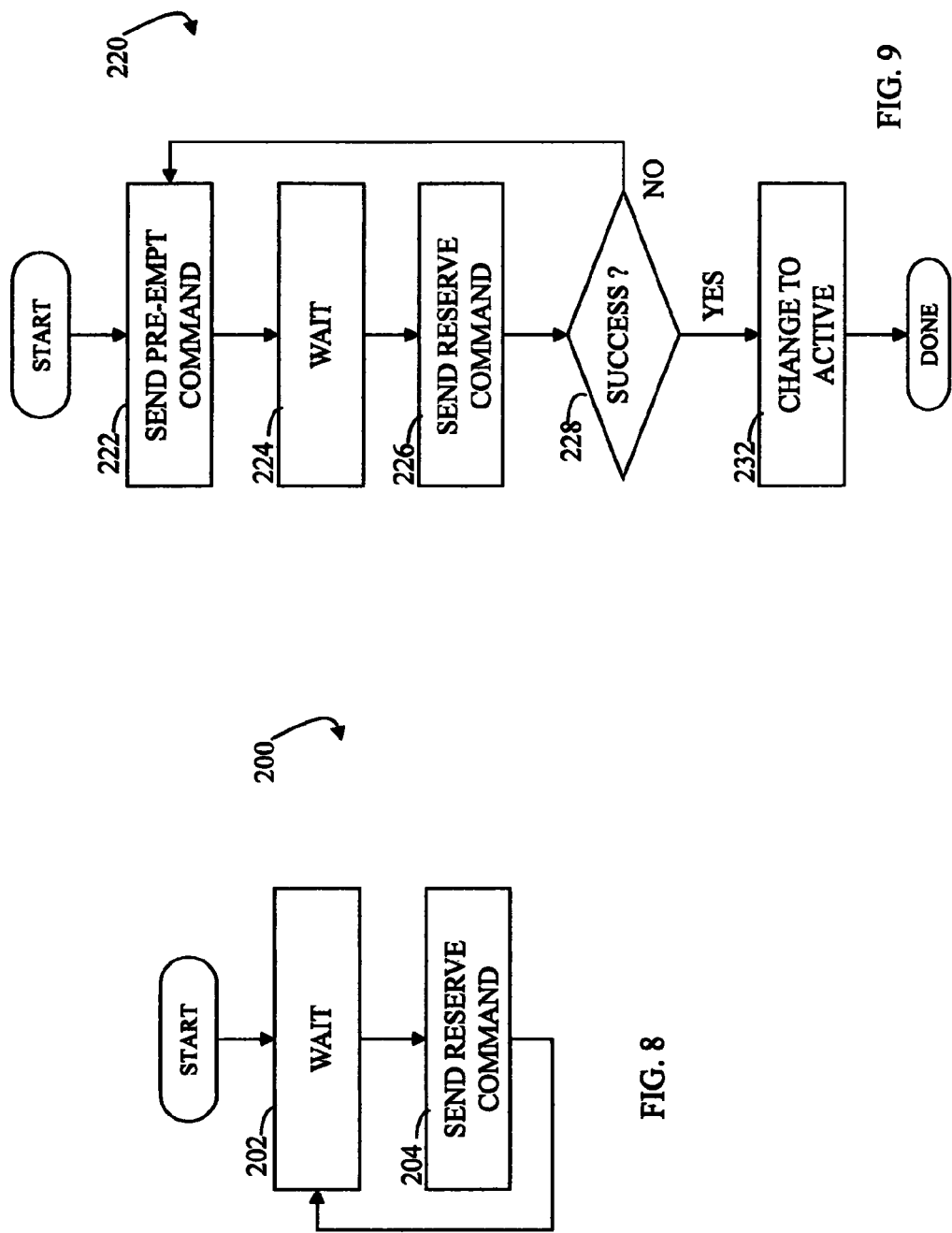
FIG. 8 is a flow chart illustrating steps performed by an active host to maintain its status in connection with the system described herein.
FIG. 9 is a flow chart illustrating steps performed by a passive host to maintain its status and possibly become an active host in connection with the system described herein.

Referring to FIG. 8, a flow chart 200 illustrates steps performed by the active host 152 in connection with maintaining its status. In an embodiment herein, the storage devices 156, 158 maintain a table like that shown in FIG. 5 and discussed above. The paths for the active host 152 are in a reserved state (allowing I/O operations between the active host 152 and the storage device 156) while the paths for the passive host 154 are in a blocked state. In an example illustrated herein, a host can request that a reservation between the storage device and another host be broken. If the other host does not re-reserve the path, the host that breaks the reservation becomes the active host. This is illustrated in more detail below.

Processing for the flow chart 200 begins at a first step 202 where the active host waits for a predetermined amount of time. The amount can be any amount, such as three seconds. Following the step 202 is a step 204 where the active host 152 sends a reservation command to the storage device. Following the step 204, control transfers back to the step 202 for another iteration.

Referring to FIG. 9, a flow chart 220 illustrates steps performed by the passive host 154 in connection with maintaining its status and possibly becoming active if conditions warrant. Processing begins at a first step 222 where the passive host 154 sends a pre-empt command to the storage device. The purpose of the pre-empt command is to attempt to take control of the I/O operations. Following the step 222 is a step 224 where the passive host 154 waits a predetermined amount of time. The amount of time may be any amount that is longer than the amount of time the active host 152 waits at the step 202, discussed above. In an embodiment herein, the amount is at least three or four times the amount of time the active host waits (e.g., ten seconds).

Following the step 224 is a step 226 where the passive host 154 sends a reserve command. Note that if the active host 152 is operational, then the active host 152 would have sent a reserve command while the passive host was waiting at the step 224. On the other hand, if the active host 152 is not operational, then the reservation provided by the passive host at the step 222 would have been the most recent reserve command received by the storage device. Following the step 226 is a test step 228 where it is determined if the reserve command attempted at the step 226 is successful. If not (the active host 152 is operational), then control transfers back to the step 222 for another iteration. Otherwise, control transfers from the step 228 to a step 232 where the passive host 154 changes its status to active. Following the step 232, processing is complete.

As can be seen from the example of FIGS. 7-9, discussed above, it is important to maintain state information when migrating data from one storage device to another. Otherwise, if state information is not maintained, then the passive host 154 may incorrectly change its status to active or may incorrectly maintain its status as passive when it should be active.

The system described herein may be used for migrating executable images between hosts as well as migrating data on storage devices. The system may also be used to hibernate and then reactivate processes/applications on hosts. A process such as a virtual machine, an application or an entire physical server, may wish to stop execution and resume it later from the exact same point, without the need for a restart (reboot). The server can freeze its resources (such as memory, registers, application state, swap files, etc.) and can freeze the SCSI state of the data. Later, the process manager can instruct the server (or a different server) to import the state and restart the data devices from exactly the same point as when hibernation was initiated. This enables the process to resume from hibernation with the same state in the server (memory, registers, etc.), the application (swap files, etc.) and storage (data, SCSI state). In turn, this means that the process can resume and start running immediately, without the need to wait for a restart.

The system may also be used to facilitate remote access. In this case, a storage array may import the SCSI state of a logical unit in order to present a cloned path to a host. This path may have all the attributes and state of the source path. The storage array presenting the new path does not have to have storage for the logical unit. Instead, the logical unit can forward any I/O requests to a path that is connected to the storage.

In some instances, the data being migrated may include replication relationships that are to be preserved after the migration. Although it is possible to manually reconfigure replication relationships after the migration, it may be more desirable to automate migration of the replication relationships so that causing a migration for a particular volume causes migration of the replication relationships that include the particular volume.

Figure 10:
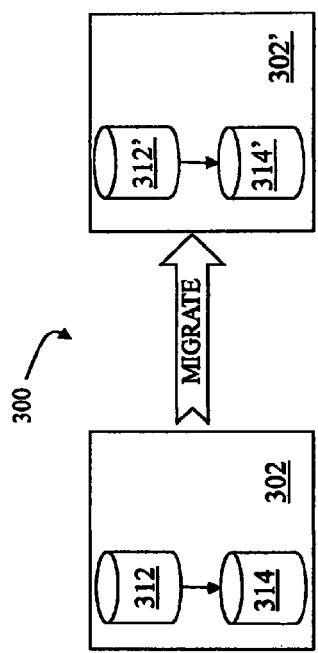
FIG. 10 is a diagram illustrating migration of a clone replication relationship according to an embodiment of the system described herein.

Referring to FIG. 10, a diagram 300 illustrates migrating data from a first site 302 to a second site 302'. The first site includes a logical volume 312 and a clone logical volume 314. The clone logical volume 314 is configured to be a point-in-time copy of the logical volume 312 so that the logical volume 314 contains the same data as the logical volume 312 at a particular point in time. In an embodiment herein, one or more of portions (e.g., tracks) of the volume 314 may be indirect (indirect tracks), and thus contain a pointer that points back to corresponding portion(s) and data of the volume 312. The indirect tracks may be resolved some time after the cloning operation. Resolving an indirect track can be achieved by copying the corresponding data from the source volume 312 to the clone 314 and removing the indirect pointer. Providing a clone operation for logical volumes is known in the art. The volumes 312, 314 may be on the same physical storage device or on a different physical storage devices.

The diagram 300 also shows the second site 302' as including a migrated logical volume 312' and a migrated clone logical volume 314'. The migrated logical volume 312' corresponds to the logical volume 312 while the migrated clone logical volume 314' corresponds to the clone logical volume 314. Just as with the volumes 312, 314 at the first site 302, the migrated clone logical volume 314' is configured to be a clone of the migrated logical volume 312' so that the logical volumes 312', 314' contain the same data. Data provided on the migrated logical volume 312' is transferred to the migrated clone logical volume 314'.

Figure 11:
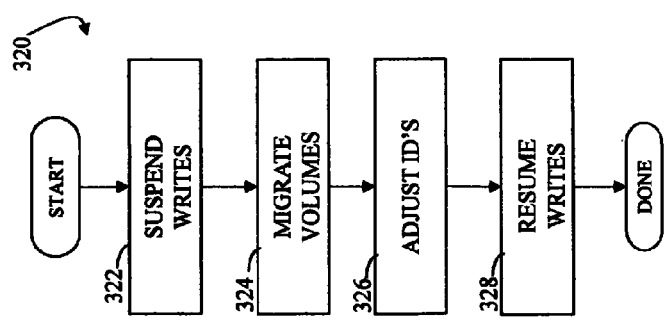
FIG. 11 is a flow chart illustrating steps performed in connection with migrating a clone replication relationship according to an embodiment of the system described herein.

Referring to FIG. 11, a flow chart 320 illustrates steps performed in connection with migrating the logical volume 312 and the clone logical volume 314. Processing begins at a first step 322 where writes to the logical volume 312 are suspended. Note that, generally, suspending writes to a volume may include draining (allowing to complete) any I/O operation to or from the volume that was begun prior to the suspension. Accordingly, for the discussion herein, suspending I/O operations for a volume should be understood to also include draining the volume.

Following the step 322 is a step 324 where the volumes 312, 314 (including state information, as described elsewhere herein) are migrated from the first site 302 to the second site 302'. Note that the relationship between the migrated logical volume 312' and the migrated clone logical volume 314' may be provided in volume metadata at the second site 302' which may be migrated as part of the migration at the step 324 or may be configured separately in a manner similar to configuring the mirroring relationship between the volumes 312, 314.

Following the step 324 is a step 326 where internal volume identifiers are adjusted, as necessary. In an embodiment herein, each of the sites 302, 302' (and possibly other sites, not shown) uses unique internal volume identifiers (e.g., numbers) to identify logical volumes. The internal volume identifiers may be different for different sites. Thus, for example, the logical volumes 312, 314 may be identified at the site 302 using the numbers 23 and 62, respectively, while the logical volumes 312', 314' may be identified at the site 302' using the numbers 26 and 57, respectively. At the step 326, any references using internal volume identifiers, such as pointers used for indirect tracks, are adjusted, as appropriate. Following the step 326, is a step 328 where writes to the logical volume 312 are resumed. It is also possible to begin using (writing to and reading from) the migrated logical volume 312' instead of, or in addition to, the logical volume 312. Following the step 328, processing is complete. Note that, for some embodiments, it is possible to have indirect tracks that point across the sites 302, 302' so that, for example, an indirect track on the migrated clone logical volume 314' at the site 302' may point to data on the logical volume 312 at the site 302.

Figure 12:
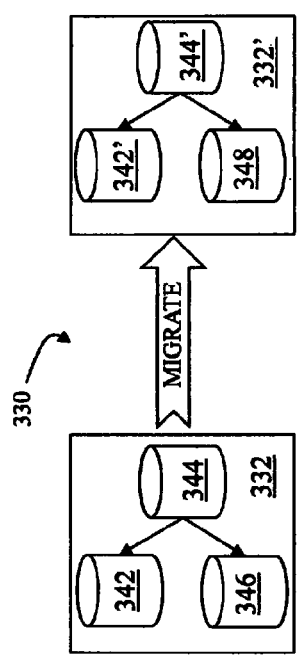
FIG. 12 is a diagram illustrating migration of a snapshot replication relationship according to an embodiment of the system described herein.

Referring to FIG. 12, a diagram 330 illustrates migrating data from a first site 332 to a second site 332'. The first site 332 includes a logical volume 342, a snapshot copy 344 of the logical volume 342, and a first log device 346. Snapshot copies are known in the art and, in some cases, may also be referred to as "virtual storage devices". See, for example, U.S. Pat. No. 7,340,489 titled "VIRTUAL STORAGE DEVICES", which is incorporated by reference herein.

In an embodiment herein, the snapshot copy 344 contains a plurality of pointers that are initially set to point to sections of the logical volume 342 when the snapshot copy 344 is established. The first time data is written to a particular portion of the logical volume 342 after establishment of the snapshot copy 344, data from the portion is copied to the first log device 346 prior to the write. In addition, a corresponding pointer of the snapshot copy 344 is set to point to the portion copied to the first log device 346. Thus, the snapshot copy 344 corresponds to a state of the logical volume 342 at the time that the snapshot copy 344 was established.

The diagram 330 also shows the second site 332' as including a migrated logical volume 342', a migrated snapshot copy 344', and a second log device 348. The migrated logical volume 342' corresponds to the logical volume 342 while the migrated snapshot copy 344' corresponds to the snapshot copy 344. The second log device 348 is different from the first log device 346, as explained in more detail elsewhere herein. Just as with the first site 332, the migrated snapshot copy 344' is configured to be a snapshot copy of the migrated logical volume 342' so that the migrated snapshot copy 344' represents a point in time version of the migrated logical volume 342'. Note that the particular time represented by the migrated snapshot copy 344' may be before the migration of data from the first site 332 to the second site 332'.

In an embodiment herein, the first log device 346 contains data used in connection with multiple snapshot copies at the first site 332 and the second log device 348 contains data used in connection with multiple snapshot copies at the second site 332'. Accordingly, some of the data for the log devices 346, 348 may not be related to either of the snapshot copies 344, 344'. Thus, when migrating data from the first site 332 to the second site 332', it is not necessary to migrate the entire first log device 346. Instead, only data on the first log device 346 corresponding to the snapshot copy 344 is migrated.

Figure 13:
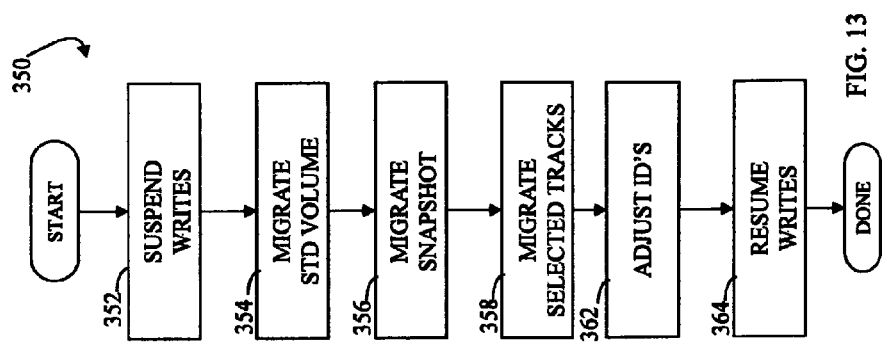
FIG. 13 is a flow chart illustrating steps performed in connection with migrating a snapshot replication relationship according to an embodiment of the system described herein.

Referring to FIG. 13, a flow chart 350 illustrates steps performed in connection with migrating the logical volume 342 and the snapshot copy 344. Processing begins at a first step 352 where writes to the logical volume 342 are suspended. Following the step 352 is a step 354 where the logical volume 342 (including state information, as described elsewhere herein) is migrated from the first site 332 to the second site 332'. Following the step 354 is a step 356 where the snapshot copy 344 (including state information, as described elsewhere herein) is migrated from the first site 332 to the second site 332'. Note that the snapshot relationship between the migrated logical volume 342' and the migrated snap copy 344' may be provided in volume metadata at the second site 332' which may be migrated as part of the migration at the steps 354, 356 or may be configured separately in a manner similar to configuring the snapshot relationship between the volumes 342, 344.

Following the step 356 is a step 358 where selected portions (e.g., tracks) from the first log device 346 are migrated to the second log device 348. In an embodiment herein, the selected portions correspond to portions of the first log device 346 that are pointed to by the snapshot copy 344. Processing at the step 358 iterates through the pointers of the snapshot copy 344 (or pointers of the migrated snapshot copy 344') and, for each that points to a portion of the first log device 346, copies the corresponding data to the second log device 348. In some embodiments, it is also possible to remove the data (free the data location) from the first log device 346.

Following the step 358 is a step 362 where internal volume identifiers are adjusted, as necessary. In an embodiment herein, each of the sites 332, 332' (and possibly other sites, not shown) uses unique internal volume identifiers (e.g., numbers) to identify logical volumes. The internal volume identifiers may be different for different sites. Thus, for example, the logical volume 342 may be identified at the site 332 using the numbers 23 while the logical volume 342' may be identified at the site 332' using the number 57. Note that the adjustments at the step 362 may include adjustments caused by data being in a different location on the second log device 348 after being transferred from the first log device 346. Following the step 362, is a step 364 where writes to the logical volume 342 are resumed. It is also possible to begin using the migrated logical volume 342' instead of, or in addition to, the logical volume 342. Following the step 364, processing is complete.

In some instances, it may be desirable to maintain replication relationships for replication that is being performed across different sites. Different types of cross-site replication exist, including synchronous replication, data mobility, and asynchronous replication. See, for example, U.S. Pat. No. 7,054,883 titled "VIRTUAL ORDERED WRITES FOR MULTIPLE STORAGE DEVICES", which is incorporated by reference herein. By convention, a source logical volume may be referred to as an "R1 volume" while a destination logical volume may be referred to as an "R2 volume".

Figure 14:
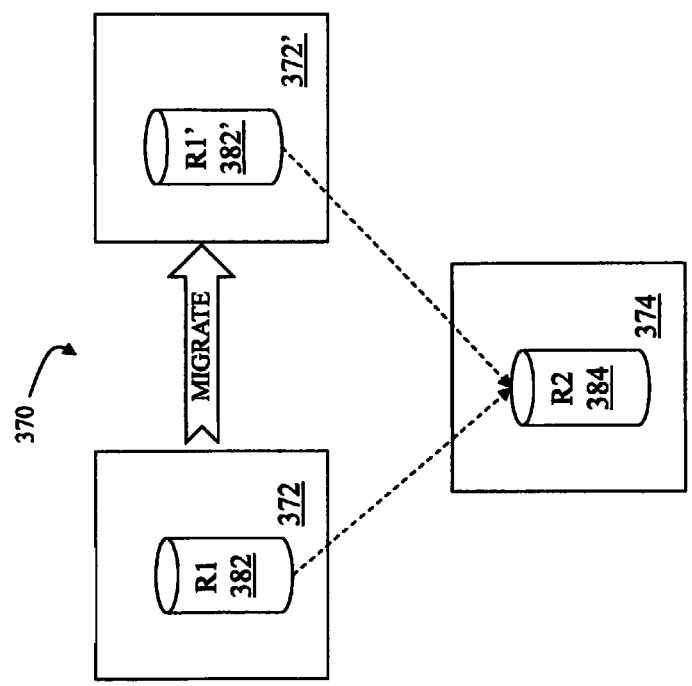
FIG. 14 is a diagram illustrating migration of an R1 volume used in a remote replication relationship according to an embodiment of the system described herein.

Referring to FIG. 14, a diagram 370 shows a first site 372, a second site 372' and a third site 374. The first site 372 includes an R1 volume 382 (source volume) while the third site 374 includes a corresponding R2 volume (destination volume). Data written to the R1 volume 382 at the first site 372 is replicated to the R2 volume 384 at the third site 374. The diagram 370 also shows the second site 372' as including a migrated R1 volume 382'. The migrated R1 volume 382' corresponds to the R1 volume 382, as described in more detail elsewhere herein.

Referring to FIG. 15, a flow chart 390 illustrates steps performed in connection with migrating the R1 volume 382 from the site 372 to the site 372' when the R1/R2 replication is synchronous or is a data mobility relationship. Processing begins at a first step 392 where writes to the R1 volume 382 are suspended. Following the step 392 is a step 394 where the R1 volume 382 (including state information, as described elsewhere herein) is migrated from the first site 372 to the second site 372'. Note that the R1/R2 relationship between the migrated R1 volume 382' and the R2 volume 384 may be provided in volume metadata at the second site 372' which may be migrated as part of the migration at the step 394 or may be configured separately in a manner similar to configuring the R1/R2 relationship between the volumes 382, 384. Note that volume metadata may include invalid bitmaps, which describe portions in the R1 volume that have not yet been transferred to the R2 volume. Note also that the metadata at the R2 site may be modified to cause the R2 volume 384 to point to the migrated R1 volume 372'.

Following the step 394 is a step 396 where internal volume identifiers are adjusted, as necessary. In an embodiment herein, each of the sites 372, 374, 372' (and possibly other sites, not shown) uses unique internal volume identifiers (e.g., numbers) to identify logical volumes. The identifiers may be different for different sites. Thus, for example, the R1 volume 382 may be identified at the site 372 using the number 23 while the migrated R1 volume 382' may be identified at the site 372' using the number 57. At the step 396, any references using internal volume identifiers are modified, as appropriate. Following the step 396 is a step 398 where R1/R2 relationships are adjusted as appropriate. In an embodiment herein, only a single R1 volume may be used for one R2 volume. Thus, the processing at the step 398 may eliminate the R1/R2 relationship between the R1 volume 382 and the R2 volume 384. In addition, additional processing may be performed at the step 398 to facilitate establishment of the new R1/R2 relationship between the migrated R1 volume 382' and the R2 volume 384.

Following the step 398, is a step 402 where writes to the migrated R1 volume 382' are resumed. It is also possible to begin using the data in the R1 volume 382 at this stage, but, of course, writes thereto will not be replicated to the R2 volume 384. Following the step 402, processing is complete.

It may also be desirable to migrate an R1 volume in systems where there is an asynchronous R1/R2 relationship. Since there are many different techniques for asynchronous data transfer, there may also be a significant number of different techniques for migrating an R1 volume that is part of an asynchronous R1/R2 relationship. Of course, it is almost always possible to simply suspend writes to the R1 device, wait for the system to settle (i.e., reach a quiescent state where R1 and R2 contain the same data), and then migrate the R1 volume. However, as explained in detail below, for particular types of asynchronous relationships, there may be more desirable ways to migrate an R1 volume.

Referring to FIG. 16, a flow chart 410 illustrates steps performed in connection with migrating the R1 volume 382 from the site 372 to the site 372' when the R1/R2 replication is asynchronous like that described in U.S. Pat. No. 7,054,883 (referenced above). Data is accumulated at the R1 volume 382 in chunks that are transferred in their entirety to the R2 volume. The R1 volume 382 has a first chunk that accumulates data writes to the R1 volume 382 and a second chunk that contains data that is being transferred to the R2 volume 384. Similarly, the R2 volume 384 has a first chunk that receives data from the R1 volume 382 and a second chunk of data that has been previously received that is being destaged to non-volatile storage at the R2 volume 384. When the second chunks of both the R1 volume 382 and the R2 volume 384 are empty, the system performs a cycle switch in which the first chunks become the second chunks and the volumes 382, 384 begin accumulating new data in the first chunks.

Processing for the flow chart 410 begins at a first step 411 where cycle switching is suspended. Following the step 411 is a step 412 where the system waits for the second chunk of the R1 volume (i.e., the chunk of the R1 volume containing data that is transmitted to the R2 volume) to become empty. The second chunk of the R1 volume is empty after all of the data of the second chunk has been transmitted to the R2 volume. Following the step 412 is a step 413 where writes to the R1 volume 382 are suspended.

Following the step 413 is a step 414 where the R1 volume 382 (including state information, as described elsewhere herein) is migrated from the first site 372 to the second site 372'. Note that the R1/R2 relationship between the migrated R1 volume 382' and the R2 volume 384 may be provided in volume metadata at the second site 372' which may be migrated as part of the migration at the step 414 or may be configured separately in a manner similar to configuring the R1/R2 relationship between the volumes 382, 384.

Following the step 414 is a step 416 where internal volume identifiers are adjusted, as necessary. In an embodiment herein, each of the sites 372, 374, 372' (and possibly other sites, not shown) uses unique internal volume identifiers (e.g., numbers) to identify logical volumes. The internal volume identifiers may be different for different sites. Thus, for example, the R1 volume 382 may be identified at the site 372 using the number 23 while the migrated R1 volume 382' may be identified at the site 372' using the number 57. At the step 416, any references using internal volume identifiers are modified. Following the step 416 is a step 418 where cycle switching between the R1 volume 382 and the migrated R1 volume 382' is resumed. Note that, since the second chunk of the R1 volume is empty (see the step 412, discussed above), it is expected that the volumes 382, 382' will switch cycles relatively soon after at approximately or exactly the same time.

Following the step 418 is a step 422 where writes to the migrated R1 volume 382' are resumed. Following the step 422 is a step 424 where the R1 volume 382 and the migrated R1 volume 382' switch cycles again. As discussed elsewhere herein, cycle switching for the volumes 382, 382' is coordinated so that volumes 382, 382' switch cycles at approximately the same time. Coordinating cycle switching is discussed in detail in U.S. Pat. No. 7,054,883 (referenced above). Following the step 424 is a step 426 where R1/R2 relationships are adjusted, as appropriate. In an embodiment herein, only a single R1 volume may be used for one R2 volume. Thus, the processing at the step 426 may break the R1/R2 relationship between the R1 volume 382 and the R2 volume 384. In addition, additional processing may be performed at the step 426 to facilitate establishment of the new R1/R2 relationship between the migrated R1 volume 382' and the R2 volume 384. Following the step 426, processing is complete.

Note that it is possible to begin using the data in the R1 volume 382 at this stage, but, of course, writes thereto will not be replicated to the R2 volume 384. Note that, with respect the asynchronous R1/R2 relationship, after the step 422, the migrated R1 volume 382' is accumulating data therefore in the first chunk thereof (described above), but does not contain any data in the second chunk thereof for transferring to the R2 volume. On the other hand, after the step 422, the R1 volume 382 does contain data in the second chunk thereof for transferring to the R2 volume 384, but any writes that are accumulated in the first chunk of the R1 volume 382 will not be transferred to the second volume 384 since the relationships are adjusted at the step 426 before that data can be transferred to the R2 volume 384.

Figure 17:
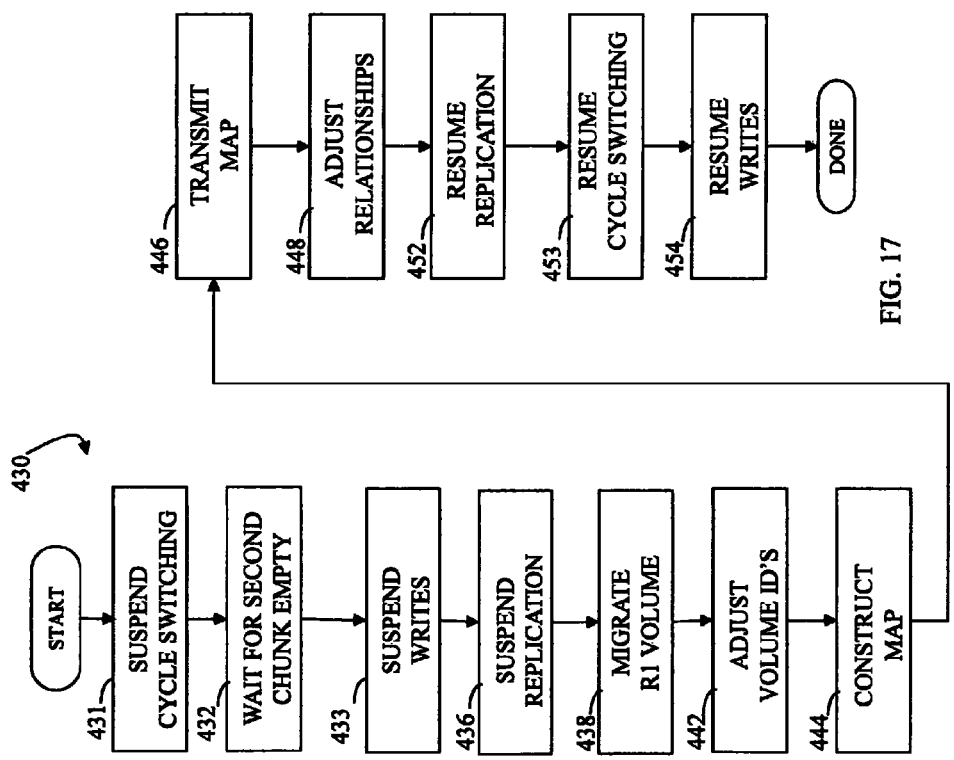
FIG. 17 is a flow chart illustrating steps performed in connection with migrating an R1 volume used in a remote replication relationship according to another embodiment of the system described herein.

Referring to FIG. 17, a flow chart 430 illustrates steps performed in connection with migrating the R1 volume 382 from the site 372 to the site 372' when the R1/R2 replication is asynchronous like that described in U.S. Pat. No. 7,054,883 (referenced above). The technique illustrated by the flow chart 430 is different than that illustrated in connection with the flow chart 410 of FIG. 16, described above.

Processing for the flow chart 430 begins at a first step 431 where cycle switching is suspended. Following the step 431 is a step 432 where the system waits for the second chunk of the R1 volume (i.e., the chunk of the R1 volume containing data that is transmitted to the R2 volume) to become empty. The second chunk of the R1 volume is empty after all of the data of the second chunk has been transmitted to the R2 volume. Following the step 432 is a step 433 where writes to the R1 volume 382 are suspended. Following the step 433 is a step 436 where replication between the R1 volume 382 and the R2 volume 384 is suspended. Following the step 436 is a step 438 where the R1 volume 382 (including state information, as described elsewhere herein) is migrated from the first site 372 to the second site 372'. Note that the R1/R2 relationship between the migrated R1 volume 382' and the R2 volume 384 may be provided in volume metadata at the second site 372' which may be migrated as part of the migration at the step 438 or may be configured separately in a manner similar to configuring the R1/R2 relationship between the volumes 382, 384.

Following the step 438 is a step 442 where internal volume identifiers are adjusted, as necessary. In an embodiment herein, each of the sites 372, 374, 372' (and possibly other sites, not shown) uses unique internal volume identifiers (e.g., numbers) to identify logical volumes. The internal volume identifiers may be different for different sites. Thus, for example, the R1 volume 382 may be identified at the site 372 using the number 23 while the migrated R1 volume 382' may be identified at the site 372' using the number 57. At the step 442, any references using internal volume identifiers are modified.

Following the step 442 is a step 444 where a map of data to be transmitted is constructed at the first site 372. The map provided at the step 444 represents data in the chunk of the R1 volume 382 that is marked for transmission to the R2 volume 384. The data to be transmitted is data corresponding to the second chunk (described above) of the R1 volume 382. Following the step 444 is a step 446 where the map is transferred to the second site 372' to be used by the migrated R1 volume 382' to determine the data that needs to be transferred to the R2 volume 384. Thus, the migrated R1 volume 382' is placed in a similar state to the R1 volume 382.

Note that the migrated R1 volume 382' uses the map to protect the data that belongs to the chunk of data from the original R1 volume 382 that had not yet been transmitted to the R2 volume 384. The map data may be deemed: "protected invalids". The migrated R1 volume 382' uses the map during the first cycle after the migrated R1 volume 382' is created by starting a background process where any track that is protected (according to the map) is copied into the second chunk (the chunk that is transmitted from R1 to R2). If a write occurs to a protected track, the data from that track is copied to the second chunk before the write can proceed. In addition, further cycle switching is prohibited until all the protections have been resolved by copying the corresponding track into the second chunk.

Following the step 446 is a step 448 where R1/R2 relationships are adjusted as appropriate. In an embodiment herein, only a single R1 volume may be used for one R2 volume. Thus, the processing at the step 448 may break the R1/R2 relationship between the R1 volume 382 and the R2 volume 384. In addition, additional processing may be performed at the step 448 to facilitate establishment of the new R1/R2 relationship between the migrated R1 volume 382' and the R2 volume 384. Following the step 448 is a step 452 where replication from the migrated R1 volume 382' to the R2 volume 384 is resumed. Following the step 452 is a step 453 where a cycle switching (described elsewhere herein) for the R1 volume 382 is resumed. Following the step 453 is a step 454 where writes to the migrated R1 volume 382' are resumed. It is also possible to begin using the R1 volume 382 at this stage, but, of course, writes thereto will not be replicated to the R2 volume 384. Following the step 454, processing is complete.

Figure 18:
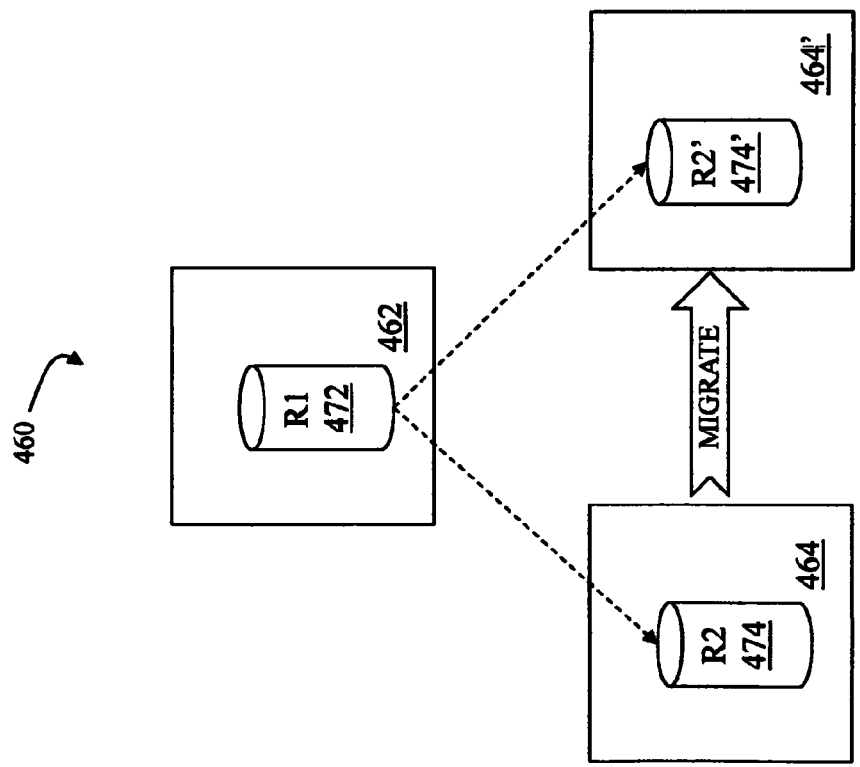
FIG. 18 is a diagram illustrating migration of an R2 volume used in a remote replication relationship according to an embodiment of the system described herein.

Referring to FIG. 18, a diagram 460 shows a first site 462, a second site 464 and a third site 464'. The first site 462 includes an R1 volume 472 while the second site 464 includes a corresponding R2 volume 474. Data written to the R1 volume 472 at the first site 372 is replicated to the R2 volume 474 at the second site 464. The diagram 460 also shows the third site 464' as including a migrated R2 volume 474'. The migrated R2 volume 474' corresponds to the R2 volume 474, as described in more detail elsewhere herein.

Referring to FIG. 19, a flow chart 480 illustrates steps performed in connection with migrating the R2 volume 474 from the site 464 to the site 464' when the R1/R2 replication is synchronous or is data mobility. Processing begins at a first step 482 where writes to the R1 volume 472 are suspended. Following the step 482 is a step 484 where the R2 volume 474 (including state information, as described elsewhere herein) is migrated from the second site 464 to the third site 464'. Note that the R1/R2 relationship between the migrated R2 volume 474' and the R2 volume 474 may be provided in volume metadata at the third site 464' which may be migrated as part of the migration at the step 484 or may be configured separately in a manner similar to configuring the R1/R2 relationship between the volumes 472, 474.

Following the step 484 is a step 486 where internal volume identifiers are adjusted, as necessary. In an embodiment herein, each of the sites 462, 464, 464' (and possibly other sites, not shown) uses unique internal volume identifiers (e.g., numbers) to identify logical volumes. The internal volume identifiers may be different for different sites. Thus, for example, the R2 volume 474 may be identified at the second site 464 using the number 23 while the migrated R2 volume 474' may be identified at the third site 464' using the number 57. At the step 486, any references using internal volume identifiers are modified. Following the step 486 is a step 488 where R1/R2 relationships are adjusted as appropriate. The processing at the step 488 may break the R1/R2 relationship between the R1 volume 472 and the R2 volume 474. However, in some embodiments, it may not be necessary to break this relationship since a single R1 volume may have multiple corresponding R2 volumes. In addition, additional processing may be performed at the step 488 to facilitate establishment of the new R1/R2 relationship between the migrated R2 volume 474' and the R1 volume 472.

Following the step 488 is a step 492 where writes to the R1 volume 472 are resumed. Following the step 492, processing is complete. Note that, as discussed above, it may be possible to maintain existing R1/R2 relationships even after migrating the R2 volume 474 so that no adjustments of the R1/R2 relationships are necessary. This is indicated by an alternative path 494 from the step 486 to the step 492 that is shown in the flow chart 480.

Figure 20:
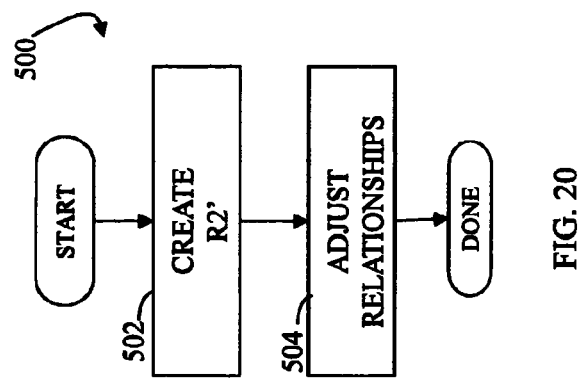
FIG. 20 is a flow chart illustrating steps performed in connection with migrating an R2 volume used in a remote replication relationship according to another embodiment of the system described herein.

Referring to FIG. 20, a flow chart 500 illustrates steps performed in connection with establishing the migrated R2 volume 474' where the R1 volume copies data to both of the R2 volumes 474, 474'. The processing illustrated by the flow chart 500 assumes that a remote mirroring mechanism allows for establishment of new destination volumes and includes a mechanism for copying data to the new destination that is independent (does not use) any data migration mechanism(s). Accordingly, this may be used with any type of remote data mirroring, including different synchronous and asynchronous remote data mirroring.

Processing for the flow chart 500 begins at a first step 502 where the R2' volume 474' is created at the third site 464'. Following the step 502 is a step 504 where a source/destination relationship is established between the R1 volume 472 and the migrated R2' volume 474'.

Following the step 504, processing is complete. Note that establishing the relationship at the step 504 results in all of the data being copied from the R1 volume 502 to the migrated R2 volume 474' using the built-in mechanism(s) of the remote mirroring system.

Referring to FIG. 21, a flow chart 510 illustrates steps performed in connection with migrating the R2 volume 474 from the second site 464 to the third site 464' when the R1/R2 replication is asynchronous like that described in U.S. Pat. No. 7,054,883 (referenced above).

Processing for the flow chart 510 begins at a first step 511 where cycle switching is suspended. Following the step 511 is a step 512 where the system waits for the second chunk of the R1 volume (i.e., the chunk of the R1 volume containing data that is transmitted to the R2 volume) to become empty. The second chunk of the R1 volume is empty after all of the data of the second chunk has been transmitted to the R2 volume. Following the step 512 is a step 513 where writes to the R1 volume 472 are suspended. Following the step 513 is a step 514 where a cycle switching (described elsewhere herein) is resumed. Note that resuming cycle switching at the step 514 will cause an almost immediate cycle switch to occur since the second chunk of the R1 volume 472 is empty after the step 512. Following the step 514 is a step 516 where a second cycle switch is initiated. Note that the two cycle switches after suspending writes to the R1 volume 472 cause both chunks of the R2 volume 474 to be empty.

Following the step 516 is a step 518 where the R2 volume 474 (including state information, as described elsewhere herein) is migrated from the second site 464 to the third site 464'. Note that the R1/R2 relationship between the R1 volume 472 and the migrated R2 volume 474' may be provided by volume metadata at the second site 464 which may be migrated as part of the migration at the step 518 or may be configured separately in a manner similar to configuring the R1/R2 relationship between the volumes 472, 474.

Following the step 518 is a step 522 where internal volume identifiers are adjusted, as necessary. In an embodiment herein, each of the sites 462, 464, 464' (and possibly other sites, not shown) uses unique internal volume identifiers (e.g., numbers) to identify logical volumes.

The internal volume identifiers may be different for different sites. Thus, for example, the R2 volume 474 may be identified at the site 464 using the number 23 while the migrated R2 volume 474' may be identified at the site 464' using the number 57. At the step 522, any references using internal volume identifiers are modified.

Following the step 522 is a step 524 where R1/R2 relationships are adjusted as appropriate. The processing at the step 524 may break the R1/R2 relationship between the R1 volume 472 and the R2 volume 474. However, in some embodiments, it may not be necessary to break this relationship since a single R1 volume may have multiple corresponding R2 volumes. In addition, additional processing may be performed at the step 524 to facilitate establishment of the new R1/R2 relationship between the migrated R2 volume 474' and the R1 volume 472. Following the step 524 is a step 526 where writes to the R1 volume 472 are resumed. Following the step 526, processing is complete.

Figure 22:
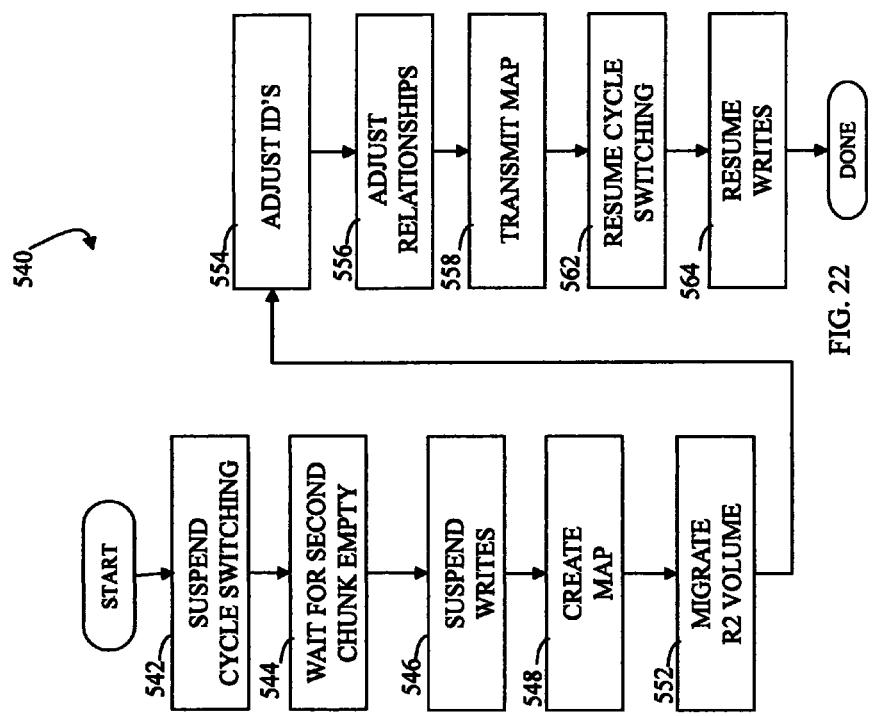
FIG. 22 is a flow chart illustrating steps performed in connection with migrating an R2 volume used in a remote replication relationship according to yet another embodiment of the system described herein.

Referring to FIG. 22, a flow chart 540 illustrates steps performed in connection with an alternative embodiment for migrating the R2 volume 474 from the second site 464 to the third site 464' when the R1/R2 replication is asynchronous like that described in U.S. Pat. No. 7,054,883 (referenced above).

Processing for the flow chart 540 begins at a first step 542 where cycle switching is suspended. Following the step 542 is a step 544 where the system waits for the second chunk of the R1 volume (i.e., the chunk of the R1 volume containing data that is transmitted to the R2 volume) and for the second chunk in the R2 volume (i.e., the chunk of the R2 volume containing data that is committed to being destaged to the disk of the R2 volume) to both become empty. The second chunk of the R1 volume is empty after all of the data of the second chunk has been transmitted to the R2 volume. The second chunk of the R2 volume is empty after all of the data has been committed to the R2 volume (e.g., destaged to the disk of the R2 volume). Following the step 544 is a step 546 where writes to the R1 volume 472 are suspended. Following the step 546 is a step 548 where a map is created at the R2 volume to indicate the data recently received from the second chunk of the R1 device while the second chunk of the R1 device was being emptied at the step 544, discussed above.

Following the step 548 is a step 552 where the R2 volume 474 (including state information, as described elsewhere herein) is migrated from the second site 464 to the third site 464'. Note that the R1/R2 relationship between the R1 volume 472 and the migrated R2 volume 474' may be provided by volume metadata at the second site 464 which may be migrated as part of the migration at the step 552 or may be configured separately in a manner similar to configuring the R1/R2 relationship between the volumes 472, 474. Following the step 552 is a step 554 where internal volume identifiers are adjusted, as necessary. In an embodiment herein, each of the sites 462, 464, 464' (and possibly other sites, not shown) uses unique internal volume identifiers (e.g., numbers) to identify logical volumes. The internal volume identifiers may be different for different sites. Thus, for example, the R2 volume 474 may be identified at the site 464 using the number 23 while the migrated R2 volume 474' may be identified at the site 464' using the number 57. At the step 554, any references using internal volume identifiers are modified. Following the step 554 is a step 556 where R1/R2 relationships are adjusted as appropriate. The processing at the step 556 may break the R1/R2 relationship between the R1 volume 472 and the R2 volume 474. However, in some embodiments, it may not be necessary to break this relationship since a single R1 volume may have multiple corresponding R2 volumes. In addition, additional processing may be performed at the step 556 to facilitate establishment of the new R1/R2 relationship between the migrated R2 volume 474' and the R1 volume 472. Following the step 556 is a step 558 where the map (constructed at the step 548, described above) is transmitted back to the R1 volume. In an embodiment herein, the map may be used to reconstruct the second chunk at the R1 volume so that the second chunk is transmitted from the R1 volume again, but this time to the migrated R2 volume 474'. Following the step 558 is a step 562 where cycle switching (described elsewhere herein) is resumed. Following the step 562 is a step 564 where writes to the R1 volume 472 are resumed. Following the step 564, processing is complete.

Note that the map constructed at the step 548 uses a "protected invalids" mechanism to protect data of the R1 volume. After writes are resumed at the step 564, in the background, the R1 copies protected data and adds it to the chunk of data to be transmitted to the R2 volume. Any new writes to a protected track cause the track to be first copied to the chunk of data for transmission to the R2 device prior to performing the write. This continues until all the protections are resolved (until the entire map is processed). Note that cycle switching may be inhibited until the entire map is processed.

In some cases, remote mirroring is provided in an active/active configuration where both volumes are writable. In such a case, it is possible to migrate one of the volumes to another site using any of the techniques described herein (alone or in combination) and then eliminating one of the initial volumes. In other cases, it is possible to have a cascaded replication configuration where at least one of the volumes is a destination for a first other volume and is a source for a second other volume. Such a volume may be migrated using any of the techniques described herein, alone or in combination.

Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of migrating data from an old storage device to a new storage device, comprising:
   transferring the data from a first logical device on the old storage device to a second logical device on the new storage device;
   determining replication relationships for the first logical device, the replication relationships specifying at least one process by which the data is replicated from the first logical device on the old storage device to at least one replication logical device;
   transferring the replication relationships to the second logical device on the new storage device; and
   performing at least one of:
   (i) transferring the at least one replication logical device, used for the replication relationships at the first logical device, from the old storage device to the new storage device for use by the second logical device, or
   (ii) identifying the at least one replication logical device, used for the replication relationships at the first logical device, to the new storage device for use by the second logical device.

2. A method, according to claim 1, wherein the replication relationships include a clone of the first logical device.

3. A method, according to claim 2, further comprising:
   suspending writes to the first logical device prior to transferring the data for the first logical device.

4. A method, according to claim 1, wherein the replication relationships include at least one snapshot.

5. A method, according to claim 4, further comprising:
   suspending writes to the first logical device; and
   transferring snapshot data from the old storage device to the new storage device after suspending writes to the first logical device.

6. A method, according to claim 1, wherein the replication relationships include at least one synchronous data transfer from the first logical device to the at least one replication logical device that is on another storage device.

7. A method, according to claim 6, further comprising:
   suspending writes to the first logical device prior to transferring the data from the first logical device to the second logical device; and
   resuming writes to the second logical device after transferring the data from the first logical device to the second logical device.

8. A method, according to claim 1, wherein the replication relationships include at least one asynchronous data transfer from the first logical device to the at least one replication logical device that is on another storage device, and wherein data writes begun after a first time and before a second time are associated with a first chunk of data and data writes begun after the second time are associated with a second chunk of data different from the first chunk of data, the times corresponding to transfer cycles.

9. A method, according to claim 8, further comprising:
suspending writes to the first logical device and suspending switching transfer cycles prior to transferring the data from the first logical device to the second logical device; and
resuming writes to the second logical device and resuming switching transfer cycles after transferring the data from the first logical device to the second logical device.

10. A method, according to claim 9, further comprising:
waiting for the first chunk of data to be transferred to the at least one replication logical device prior to suspending switching transfer cycles.

11. A method, according to claim 1, wherein the replication relationships include at least one asynchronous data transfer from the at least one replication logical device that is on another storage device to the first logical device and wherein data writes begun after a first time and before a second time are associated with a first chunk of data and data writes begun after the second time are associated with a second chunk of data different from the first chunk of data, the times corresponding to transfer cycles.

12. A method, according to claim 11, further comprising:
suspending writes to the at least one replication logical device and suspending switching transfer cycles prior to transferring the data from the first logical device to the second logical device; and
resuming writes to the at least one replication logical device and resuming switching transfer cycles after transferring the data from the first logical device to the second logical device.

13. A method, according to claim 12, further comprising:
waiting for the first chunk of data to be transferred to the first logical device prior to suspending switching transfer cycles.

14. A non-transitory computer-readable medium storing software that, when executed by at least one processor, facilitates migration of data from an old storage device to a new storage device, the software comprising:
executable code that transfers the data from a first logical device on the old storage device to a second logical device on the new storage device;
executable code that determines replication relationships for the first logical device, the replication relationships specifying at least one process by which the data is replicated from the first logical device on the old storage device to at least one replication logical device;
executable code that transfers the replication relationships to the second logical device on the new storage device; and
executable code that performs at least one of:
(i) transfers the at least one replication logical device, used for the replication relationships at the first logical device, from the old storage device to the new storage device for use by the second logical device, or
(ii) identifies the at least one replication logical device, used for the replication relationships at the first logical device, to the new storage device for use by the second logical device.

15. The non-transitory computer-readable medium according to claim 14, wherein the software further comprises:
executable code that suspends writes to the first logical storage device prior to transferring the data for the first logical storage device, wherein the replication relationships include a clone of the first logical device.

16. The non-transitory computer-readable medium according to claim 14, wherein the software further comprises:

executable code that suspends writes to the first logical device; and
executable code that transfers snapshot data from the old storage device to the new storage device after suspending writes to the first logical device, wherein the replication relationships include at least one snapshot.

17. The non-transitory computer-readable medium according to claim 14, wherein the software further comprises:
executable code that suspends writes to the first logical device prior to transferring the data from the first logical device to the second logical device; and
executable code that resumes writes to the second logical device after transferring the data from the first logical device to the second logical device, wherein the replication relationships include at least one synchronous data transfer from the first logical device to a third the at least one replication logical device that is on another storage device.

18. The non-transitory computer-readable medium according to claim 14, wherein the software further comprises:
executable code that suspends writes to the first logical device and suspends switching transfer cycles prior to transferring the data from the first logical device to the second logical device; and
executable code that resumes writes to the second logical device and resumes switching transfer cycles after transferring the data from the first logical device to the second logical device, wherein the replication relationships include at least one asynchronous data transfer from the first logical device to the at least one replication logical device that is on another storage device and wherein data writes begun after a first time and before a second time are associated with a first chunk of data and data writes begun after the second time are associated with a second chunk of data different from the first chunk of data, the times corresponding to transfer cycles.

19. The non-transitory computer-readable medium according to claim 14, wherein the software further comprises:
executable code that waits for the first chunk of data to be transferred to the third at least one replication logical device prior to suspending switching transfer cycles.

20. The non-transitory computer-readable medium according to claim 14, wherein the software further comprises:
executable code that suspends writes to the at least one replication logical device and suspends switching transfer cycles prior to transferring the data from the first logical device to the second logical device;
executable code that resumes writes to the at least one replication logical device and resumes switching transfer cycles after transferring the data from the first logical device to the second logical device; and
executable code that waits for the first chunk of data to be transferred to the first logical device prior to suspending switching transfer cycles, wherein the replication relationships include at least one asynchronous data transfer from the at least one replication logical device that is on another storage device to the first logical device and wherein data writes begun after a first time and before a second time are associated with a first chunk of data and data writes begun after the second time are associated with a second chunk of data different from the first chunk of data, the times corresponding to transfer cycles.

* * * * *